United States Patent
Ashizawa et al.

(10) Patent No.: US 8,921,022 B2
(45) Date of Patent: *Dec. 30, 2014

(54) TONER FOR ELECTROSTATIC IMAGE DEVELOPMENT

(71) Applicant: Kao Corporation, Chuo-ku (JP)

(72) Inventors: Takeshi Ashizawa, Wakayama (JP);
Shogo Watanabe, Izumiotsu (JP);
Takashi Kubo, Wakayama (JP);
Norihiro Hirai, Wakayama (JP)

(73) Assignee: Kao Corporation, Chuo-ku (JP)

( * ) Notice: Subject to any disclaimer, the term of this patent is extended or adjusted under 35 U.S.C. 154(b) by 38 days.

This patent is subject to a terminal disclaimer.

(21) Appl. No.: 13/792,732

(22) Filed: Mar. 11, 2013

(65) Prior Publication Data
US 2013/0273467 A1  Oct. 17, 2013

(30) Foreign Application Priority Data
Apr. 11, 2012  (JP) .................... 2012-090350

(51) Int. Cl.
*G03G 9/08*  (2006.01)

(52) U.S. Cl.
USPC .................... 430/109.4; 430/108.8

(58) Field of Classification Search
CPC ............. G03G 9/08755; G03G 9/08782
USPC .................... 430/109.4, 108.8
See application file for complete search history.

(56) References Cited

U.S. PATENT DOCUMENTS

| 2004/0241564 A1 | 12/2004 | Hidaka et al. |
| 2009/0047590 A1 | 2/2009 | Iga |
| 2010/0174044 A1 | 7/2010 | Eritate |
| 2013/0071785 A1 | 3/2013 | Moroiwa et al. |

FOREIGN PATENT DOCUMENTS

| JP | 2005-141189 | 6/2005 |
| JP | 2007-271939 | 10/2007 |
| JP | 2008-291243 | 12/2008 |
| JP | 2009-197110 | 9/2009 |
| JP | 2011-246650 | 12/2011 |
| JP | 2012-107228 | 6/2012 |
| WO | WO 2011/148545 A1 | 12/2011 |

OTHER PUBLICATIONS

U.S. Appl. No. 13/822,105, filed Mar. 11, 2013, Kubo, et al.

*Primary Examiner* — Mark A Chapman
(74) *Attorney, Agent, or Firm* — Oblon, Spivak, McClelland, Maier & Neustadt, L.L.P.

(57) ABSTRACT

A toner for electrostatic image development containing a resin binder and a releasing agent, wherein the resin binder contains a polyester A having a furan ring, and wherein the releasing agent contains an ester wax, and a method for producing the toner. The toner for electrostatic image development of the present invention can be suitably used in, for example, the development or the like of latent image formed in electrophotography, an electrostatic recording method, an electrostatic printing method, or the like.

20 Claims, No Drawings

TONER FOR ELECTROSTATIC IMAGE DEVELOPMENT

FIELD OF THE INVENTION

The present invention relates to a toner for electrostatic image development usable in developing latent images formed in, for example, electrophotography, an electrostatic recording method, an electrostatic printing method, or the like, and a method for producing the toner.

BACKGROUND OF THE INVENTION

With the trends of reduction in energy consumption and speeding-up of printing speeds in the recent years, a toner having low-temperature fusing ability is in demand. In order to meet this demand, toners containing ester waxes have been numerously studied.

For example, it is disclosed that a toner in which a specified ester wax and a specified aliphatic hydrocarbon polymer are used has a good balance between storage property and low-temperature fusing ability, the toner further having excellent offset resistance and durability (see Patent Publication 1 (Japanese Patent Laid-Open No. 2007-271939)).

In addition, it is disclosed that a toner in which a specified ester wax and a specified petroleum wax are used has excellent properties in both fusing ability and durability, especially jumping property in the jumping development method (see Patent Publication 2 (Japanese Patent Laid-Open No. 2005-141189)).

On the other hand, the use of biomass raw materials are earnestly desired, from the viewpoint of reduction in environmental loads.

For example, it is disclosed that a thermoplastic resin characterized in that the thermoplastic resin has a furan structure, and has a reducing viscosity ($\eta$sp/C) of 0.48 dL/g or more, and a terminal acid value of less than 200 µeq/g has excellent heat resistance, mechanical properties, and weathering resistance (see Patent Publication 3 (Japanese Patent Laid-Open No. 2008-291243)).

In addition, it is disclosed that a polyester resin having a specified structural unit of a furan ring has excellent impact resistance, and is suitable for materials for producing molding articles (see Patent Publication 4 (Japanese Patent Laid-Open No. 2009-197110)).

SUMMARY OF THE INVENTION

The present invention relates to:

[1] a toner for electrostatic image development containing a resin binder and a releasing agent, wherein the resin binder contains a polyester A having a furan ring, and wherein the releasing agent contains an ester wax; and

[2] a method for producing a toner for electrostatic image development that contains at least a resin binder and a releasing agent, including melt-kneading components containing a resin binder and a releasing agent with an open-roller type kneader to give a melt-kneaded mixture, wherein the resin binder contains a polyester A having a furan ring, and wherein the releasing agent contains an ester wax.

DETAILED DESCRIPTION OF THE INVENTION

However, the resin described in Patent Publication 3 is used mainly in film applications or applications for injection-molded products, so that the resin has a high crystallinity, thereby making it unsuitable for a resin binder for use in a toner. Also, the resin described in Patent Publication 4 is a composition for molded articles, so that the resin has a high crystallinity, thereby making it unsuitable for a resin binder for use in a toner.

In addition, the toners described in Patent Publications 1 and 2 are still insufficient for further demands in low-temperature fusing ability and heat-resistant storage property.

The present invention relates to a toner for electrostatic image development having excellent low-temperature fusing ability and excellent heat-resistant storage property, and a method for producing the toner.

The toner for electrostatic image development of the present invention exhibits some effects of having excellent low-temperature fusing ability and excellent heat-resistant storage property.

These and other advantages of the present invention will be apparent from the following description.

The toner for electrostatic image development of the present invention is a toner at least containing a resin binder and a releasing agent, wherein the resin binder contains a polyester having a furan ring, and wherein the releasing agent contains an ester wax.

Although not wanting to be limited by theory, the reasons why the toner for electrostatic image development of the present invention exhibits some effects of having excellent low-temperature fusing ability and excellent heat-resistant storage property are not fully elucidated, it is deduced to be as follows.

Since the resin having a furan ring has a high glass transition temperature, even when its softening point is lowered, in other words, even when the molecular weight is made smaller, the low-temperature fusing ability can be improved without lowering heat-resistant storage property and high-temperature offset resistance. Since the molecular weight of the resin can be lowered, it is considered that the compatibility with the ester wax is improved, so that low-temperature fusing ability is even more improved without lowering heat-resistant storage property and high-temperature offset resistance.

<Resin Binder>

The resin binder used in the toner of the present invention contains a polyester A having a furan ring.

The polyester A is preferably a polyester obtained by polycondensing a carboxylic acid component and an alcohol component, using as raw material monomers a carboxylic acid component containing at least a carboxylic acid compound having a furan ring and/or an alcohol component containing an alcohol having a furan ring, in which the furan ring having a structure represented by formula (Ia) or (Ib):

is preferred.

In addition, it is preferable that the polyester A having a furan ring is an amorphous resin, from the viewpoint of improving heat-resistant storage property and high-temperature offset resistance of the toner.

Here, the crystallinity of the resin is expressed by a crystallinity index defined by a value of a ratio of a softening point to a highest temperature of endothermic peak determined by a scanning differential calorimeter, i.e. softening point/highest temperature of endothermic peak. The crystalline resin is a resin having a crystallinity index of from 0.6 to 1.4, preferably from 0.7 to 1.2, and more preferably from 0.9 to 1.2, and the amorphous resin is a resin having a crystallinity index exceeding 1.4 or less than 0.6. The crystallinity of the resin can be adjusted by the kinds of the raw material monomers, a ratio thereof, production conditions, e.g., reaction temperature, reaction time, cooling rate, and the like. Here, the highest temperature of endothermic peak refers to a temperature of the peak on the highest temperature side among endothermic peaks observed. When a difference between the highest temperature of endothermic peak and the softening point is within 20° C., the highest temperature of endothermic peak is defined as a melting point. When the difference between the highest temperature of endothermic peak and the softening point exceeds 20° C., the peak is a peak temperature ascribed to a glass transition.

The carboxylic acid compound having a furan ring includes furan dicarboxylic acid compounds such as 2,5-furan dicarboxylic acid, 2,4-furan dicarboxylic acid, 2,3-furan dicarboxylic acid, and 3,4-furan dicarboxylic acid; furan carboxylic acid compounds such as 2-furan carboxylic acid and 3-furan carboxylic acid; hydroxyfuran carboxylic acid compounds such as 5-hydroxymethyl-furan-2-carboxylic acid; carboxylic acid compounds such as furfuryl acetic acid compounds and 3-carboxy-4-methyl-5-propyl-2-furan propionate; and the like. In the present specification, the carboxylic acid compound includes carboxylic acids, esters formed between the carboxylic acids and alcohols having from 1 to 6 carbon atoms, preferably from 1 to 3 carbon atoms, acid anhydrides thereof, and hydroxycarboxylic acid compounds.

Among them, at least one member selected from the group consisting of the furan dicarboxylic acid compounds, the furan carboxylic acid compounds, and the hydroxyfuran carboxylic acid compounds are preferred, the furan dicarboxylic acid compounds are more preferred, and 2,5-furan dicarboxylic acid is even more preferred, from the viewpoint of improving low-temperature fusing ability, heat-resistant storage property, and durability of the toner.

The alcohol having a furan ring includes furan di-alcohols such as dihydroxyfuran; hydroxymethyl furfuryl alcohols such as 5-hydroxymethyl furfuryl alcohol; furfuryl alcohol; 5-hydroxymethyl furfural, and the like.

The carboxylic acid compound having a furan ring represented by the formula (Ia) includes carboxylic acid compounds such as furan dicarboxylic acid compounds such as 2,5-furan dicarboxylic acid, 2,4-furan dicarboxylic acid, 2,3-furan dicarboxylic acid, and 3,4-furan dicarboxylic acid; hydroxyfuran carboxylic acid compounds such as 5-hydroxymethyl-furan-2-carboxylic acid; and the like, and the furan dicarboxylic acid compounds are preferred.

The alcohol having a furan ring represented by the formula (Ia) includes hydroxymethyl furfuryl alcohols such as 5-hydroxymethyl furfuryl alcohol; furan di-alcohols such as dihydroxyfuran; 5-hydroxymethyl furfural, and the like, and the furan di-alcohols are preferred.

The carboxylic acid compound having a furan ring represented by the formula (Ib) includes furan carboxylic acid compounds such as 2-furan carboxylic acid and 3-furan carboxylic acid; furfuryl acetic acid compounds; and the like.

The alcohol having a furan ring represented by the formula (Ib) includes furfuryl alcohol and the like.

Among the carboxylic acid compounds and the alcohols mentioned above, the carboxylic acid compound and the alcohol each having a furan ring represented by the formula (Ia) are preferred, the furan dicarboxylic acid compounds and the furan di-alcohols are more preferred, and the furan dicarboxylic acid compounds are even more preferred, from the viewpoint of improving low-temperature fusing ability, heat-resistant storage property, and durability of the toner.

A total amount of the carboxylic acid compound having a furan ring and the alcohol having a furan ring is preferably from 10 to 100% by mol, more preferably from 20 to 90% by mol, even more preferably from 20 to 80% by mol, still even more preferably from 30 to 70% by mol, and still even more preferably from 40 to 50% by mol, of the total amount of the carboxylic acid component and the alcohol component of the polyester A, from the viewpoint of improving low-temperature fusing ability, heat-resistant storage property, durability, and high-temperature offset resistance of the toner.

Further, the content of the carboxylic acid compound having a furan ring is preferably from 10 to 100% by mol, more preferably from 20 to 100% by mol, even more preferably from 30 to 100% by mol, still even more preferably from 60 to 100% by mol, still even more preferably from 90 to 100% by mol, still even more preferably substantially 100% by mol, and still even more preferably 100% by mol, of the carboxylic acid component of the polyester A, from the viewpoint of improving low-temperature fusing ability, heat-resistant storage property, durability, and high-temperature offset resistance of the toner.

The content of the furan dicarboxylic acid compound is preferably from 10 to 100% by mol, more preferably from 20 to 100% by mol, even more preferably from 30 to 100% by mol, still even more preferably from 60 to 100% by mol, still even more preferably from 90 to 100% by mol, still even more preferably substantially 100% by mol, and still even more preferably 100% by mol, of the carboxylic acid component of the polyester A, from the same viewpoint.

When the carboxylic acid compound having a furan ring is used, an alcohol having a furan ring may not be used. When the alcohol having a furan ring is used, the content of the alcohol having a furan ring is preferably from 10 to 100% by mol, more preferably from 20 to 90% by mol, even more preferably from 20 to 80% by mol, and still even more preferably from 20 to 60% by mol, of the alcohol component of the polyester A, from the viewpoint of improving low-temperature fusing ability, heat-resistant storage property, durability, and high-temperature offset resistance of the toner.

Here, in a case where the resin binder contains a plural polyester A's, the total amount of the carboxylic acid compound having a furan ring and the alcohol having a furan ring, the content of the carboxylic acid compound having a furan ring, the content of the furan dicarboxylic acid compound, and the content of the alcohol having a furan ring are obtained by the sum of the products multiplying the content of each of the compounds in each of the polyester A's and a weight percentage of each of the polyester A's.

As the alcohol component other than the alcohol having a furan ring, the aliphatic diol is preferred, from the viewpoint of improving low-temperature fusing ability of the toner. The number of carbon atoms of the aliphatic diol is preferably from 2 to 10, more preferably from 3 to 8, and even more preferably from 3 to 4, from the viewpoint of improving low-temperature fusing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, an aliphatic diol having a hydroxyl group bonded to a secondary carbon atom is preferred, from the viewpoint of improving heat-resistant storage property of the toner by further lowering the mobility of the resin together with the furan ring. The number of carbon atoms of the aliphatic diol is preferably from 3 to 8, more preferably from 3 to 6, and even more preferably from 3 to 4, from the viewpoint of improving low-temperature fusing ability and heat-resistant storage property of the toner. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like. Among them, 1,2-propanediol and 2,3-butanediol are preferred, from the viewpoint of improving heat-resistant storage property of the toner.

The content of the aliphatic diol is preferably from 20 to 100% by mol, more preferably from 50 to 100% by mol, even more preferably from 70 to 100% by mol, still even more preferably substantially 100% by mol, and still even more preferably 100% by mol, of the alcohol component other than the alcohol having a furan ring, from the viewpoint of improving low-temperature fusing ability of the toner.

The content of the aliphatic diol having a hydroxyl group bonded to a secondary carbon atom is preferably from 20 to 100% by mol, more preferably from 50 to 100% by mol, even more preferably from 70 to 100% by mol, still even more preferably substantially 100% by mol, and still even more preferably 100% by mol, of the alcohol component other than the alcohol having a furan ring, from the viewpoint of improving low-temperature fusing ability and heat-resistant storage property of the toner.

The content of the aliphatic diol is preferably from 20 to 100% by mol, more preferably from 50 to 100% by mol, even more preferably from 70 to 100% by mol, still even more preferably substantially 100% by mol, and still even more preferably 100% by mol, of the alcohol component, from the viewpoint of improving low-temperature fusing ability of the toner.

The content of the aliphatic diol having a hydroxyl group bonded to a secondary carbon atom is preferably from 20 to 100% by mol, more preferably from 50 to 100% by mol, even more preferably from 70 to 100% by mol, still even more preferably substantially 100% by mol, and still even more preferably 100% by mol, of the alcohol component, from the viewpoint of improving low-temperature fusing ability and heat-resistant storage property of the toner.

The alcohol component other than these includes an aromatic alcohol, from the viewpoint of improving heat-resistant storage property of the toner.

The aromatic alcohol includes an alkylene oxide adduct of bisphenol A represented by the formula (II):

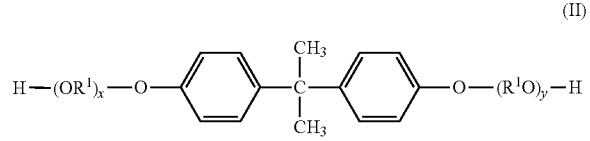
(II)

wherein $R^1O$ and $OR^1$ are an oxyalkylene group, wherein $R^1$ is an ethylene group and/or a propylene group; and each of x and y is a positive number showing the number of moles of alkylene oxide added, wherein an average number of the sum of x and y is preferably from 1 to 16, more preferably from 1 to 8, and even more preferably from 1.5 to 4, from the viewpoint of improving heat-resistant storage property of the toner.

Specific examples of the alkylene oxide adduct of bisphenol A represented by the formula (II) include an alkylene oxide adduct of bisphenol A, such as a polyoxypropylene adduct of 2,2-bis(4-hydroxyphenyl)propane and a polyoxyethylene adduct of 2,2-bis(4-hydroxyphenyl)propane; and the like.

In the present invention, it is preferable that the alcohol component contains a trihydric or higher polyhydric alcohol, preferably at least one member selected from the group consisting of glycerol, pentaerythritol, and trimethylolpropane, and more preferably glycerol, from the viewpoint of improving durability and high-temperature offset resistance of the toner. The content of the trihydric or higher polyhydric alcohol is preferably from 1 to 35% by mol, more preferably from 10 to 30% by mol, and even more preferably from 20 to 25% by mol, of the alcohol component, from the viewpoint of improving durability and high-temperature offset resistance of the toner.

As the carboxylic acid component other than the carboxylic acid compound having a furan ring, an aromatic dicarboxylic acid compound, an aliphatic dicarboxylic acid compound, and a tricarboxylic or higher polycarboxylic acid compound may be contained. In the present invention, carboxylic acids, derivatives such as acid anhydrides and alkyl esters thereof of which alkyl moiety has 1 to 6 carbon atoms and the like are collectively referred to as a carboxylic acid compound.

The aromatic dicarboxylic acid compound includes phthalic acid, isophthalic acid, terephthalic acid, acid anhydrides thereof, alkyl esters thereof of which alkyl moiety has 1 to 6 carbon atoms, and the like.

The aliphatic dicarboxylic acid compound includes oxalic acid, malonic acid, maleic acid, fumaric acid, citraconic acid, itaconic acid, glutaconic acid, succinic acid, adipic acid, sebacic acid, azelaic acid, acid anhydrides thereof, and alkyl esters thereof of which alkyl moiety has 1 to 6 carbon atoms, and the like.

The tricarboxylic or higher polycarboxylic acid compound includes trimellitic acid, pyromellitic acid, acid anhydrides thereof, and alkyl esters thereof of which alkyl moiety has 1 to 6 carbon atoms, and the like.

The alcohol component may properly contain a monohydric alcohol not having a furan ring, and the carboxylic acid component may properly contain a monocarboxylic acid component not having a furan ring, from the viewpoint of adjusting the softening point of the polyester.

The carboxylic acid component and the alcohol component in the polyester A are in an equivalent ratio, i.e. COOH group or groups/OH group or groups, of preferably from 0.70 to 1.10, and more preferably from 0.75 to 1.00, from the viewpoint of reducing an acid value of the polyester A.

The polycondensation reaction of the alcohol component and the carboxylic acid component can be carried out by polycondensing the components in an inert gas atmosphere at a temperature of from 180° to 250° C. or so, optionally in the presence of an esterification catalyst, an esterification promoter, a polymerization inhibitor or the like. The esterification catalyst includes tin compounds such as dibutyltin oxide and tin(II) 2-ethylhexanoate; titanium compounds such as titanium diisopropylate bistriethanolaminate; and the like. The esterification promoter includes gallic acid, and the like. The amount of the esterification catalyst used is preferably from 0.01 to 1.5 parts by weight, and more preferably from 0.1 to 1.0 part by weight, based on 100 parts by weight of a total amount of the alcohol component and the carboxylic acid component. The amount of the esterification promoter used is preferably from 0.001 to 0.5 parts by weight, and more preferably from 0.01 to 0.1 parts by weight, based on 100 parts by weight of a total amount of the alcohol component and the carboxylic acid component.

The polyester A has a softening point of preferably from 90° to 160° C., and more preferably from 90° to 155° C., from the viewpoint of improving low-temperature fusing ability, heat-resistant storage property, durability, and high-temperature offset resistance of the toner.

Here, in a case where the resin binder contains a plural number of polyester A's, it is preferable that the sum of products multiplying the softening points of each of the polyester A's and a weight percentage of each of the polyester A's falls within the above range.

The softening point of the polyester A can be controlled by adjusting the kinds and compositional ratios of the alcohol component and the carboxylic acid component, an amount of a catalyst, or the like, or selecting reaction conditions such as reaction temperature, reaction time and reaction pressure.

The polyester A has a glass transition temperature of preferably from 50° to 85° C., and more preferably from 60° to 75° C., from the viewpoint of improving low-temperature fusing ability, heat-resistant storage property, durability, and high-temperature offset resistance of the toner.

The glass transition temperature of the polyester A can be controlled by the kinds and compositional ratios of the alcohol component and the carboxylic acid component, and the like.

Here, in a case where the resin binder contains a plural number of polyester A's, it is preferable that the sum of products multiplying the glass transition temperatures of each of the polyester A's and a weight percentage of each of the polyester A's falls within the above range.

The polyester A has an acid value of preferably 30 mg KOH/g or less, and more preferably 25 mg KOH/g or less, from the viewpoint of improving triboelectric stability, heat-resistant storage property, durability, and high-temperature offset resistance of the toner.

The acid value of the polyester A can be controlled by adjusting the kinds and compositional ratios of the alcohol component and the carboxylic acid component, an amount of a catalyst, or the like, or selecting reaction conditions such as reaction temperature, reaction time and reaction pressure.

It is preferable that the resin binder used in the present invention contains two or more kinds of polyesters having different softening points, from the viewpoint of improving low-temperature fusing ability and high-temperature offset resistance of the toner.

The polyester H having a higher softening point and the polyester L having a lower softening point have a difference in softening points of preferably 10° C. or more, more preferably from 20° to 60° C., and even more preferably from 30° to 50° C., from the viewpoint of improving low-temperature fusing ability and high-temperature offset resistance of the toner.

The polyester H has a softening point of preferably from exceeding 125° C. and 160° C. or lower, and more preferably from 135° to 155° C., from the viewpoint of improving low-temperature fusing ability, high-temperature offset resistance, and durability of the toner.

The polyester L has a softening point of preferably from 90° to 125° C., and more preferably from 90° to 110° C., from the viewpoint of improving low-temperature fusing ability, high-temperature offset resistance and heat-resistant storage property of the toner.

The resin binder may contain a plural number of polyester L's and a plural number of polyester H's. When the resin binder contains a plural number of polyester L's and a plural number of polyester H's, it is preferable that the softening point of the polyester L and the softening point of the polyester H are such that the sum of products multiplying the softening points of each of the polyesters and a weight percentage of each of the polyesters falls within the above range.

The softening point of the polyester can be controlled by adjusting the kinds and compositional ratios of the alcohol component and the carboxylic acid component, an amount of a catalyst, or the like, or selecting reaction conditions such as reaction temperature, reaction time and reaction pressure.

A total content of the polyester H and the polyester L is preferably 80% by weight or more, more preferably 90% by weight or more, even more preferably 95% by weight or more, still even more preferably substantially 100% by weight, and still even more preferably 100% by weight, of the resin binder, from the viewpoint of improving low-temperature fusing ability, high-temperature offset resistance, and heat-resistance storage property of the toner.

In the resin binder used in the present invention, it is preferable that at least one of the polyester H and the polyester L is a polyester A, and it is more preferable that the polyester L and the polyester H are polyester A's, from the viewpoint of improving low-temperature fusing ability, heat-resistant storage property, and durability of the toner.

The polyester other than the polyester A is not particularly limited.

Preferred embodiments of the alcohol component of the polyester other than the polyester A are the same as the alcohol component other than the alcohol having a furan ring of the polyester A, and an aliphatic diol is preferred, and an aliphatic diol having a hydroxyl group bonded to a secondary carbon atom is more preferred.

In addition, the alcohol component contains preferably trihydric or higher polyhydric alcohols, more preferably trihydric alcohols, and even more preferably glycerol, from the viewpoint of improving low-temperature fusing ability, high-temperature offset resistance, heat-resistant storage property, and durability of the toner.

Preferred contents of the aliphatic diol, the aliphatic diol having a hydroxyl group bonded to a secondary carbon atom, and the trihydric or higher polyhydric alcohol in the alcohol component are the same as those in the embodiments mentioned in the polyester A.

In addition, it is preferable that the carboxylic acid component of the polyester other than the polyester A is an aromatic carboxylic acid compound, from the viewpoint of improving triboelectric stability, heat-resistant storage property, and durability of the toner. Specific examples include phthalic acid, isophthalic acid, terephthalic acid, acid anhydrides thereof, alkyl esters thereof of which alkyl moiety has 1 to 6 carbon atoms, and the like.

The content of the aromatic carboxylic acid compound is preferably from 20 to 100% by mol, more preferably from 50 to 100% by mol, even more preferably from 80 to 100% by mol, still even more preferably substantially 100% by mol, and still even more preferably 100% by mol, of the carboxylic acid component, from the viewpoint of improving triboelectric stability, heat-resistant storage property, and durability of the toner.

The content of the polyester A is preferably 10% by weight or more, more preferably 30% by weight or more, even more preferably 50% by weight or more, still even more preferably 80% by weight or more, still even more preferably substantially 100% by weight, and still even more preferably 100% by weight, of the resin binder, from the viewpoint of improving low-temperature fusing ability, heat-resistant storage property, and durability of the toner.

In addition, a total amount of the carboxylic acid compound having a furan ring and the alcohol having a furan ring is preferably 5% by mol or more, more preferably 15% by mol or more, even more preferably 20% by mol or more, still even more preferably 30% by mol or more, and still even more preferably 40% by mol or more, of a total amount of the carboxylic acid component and the alcohol component of all the polyesters in the resin binder, from the viewpoint of improving low-temperature fusing ability, heat-resistant storage property, and durability of the toner. Also, a total amount of the carboxylic acid compound having a furan ring and the alcohol having a furan ring is preferably 80% by mol or less, more preferably 70% by mol or less, even more preferably 60% by mol or less, and still even more preferably 50% by mol or less, of a total amount of the carboxylic acid component and the alcohol component of all the polyesters in the resin binder, from the viewpoint of improving high-temperature offset resistance of the toner. Taking these viewpoints together, a total amount of the carboxylic acid compound having a furan ring and the alcohol having a furan ring is preferably from 5 to 80% by mol, more preferably from 15 to 80% by mol, even more preferably from 20 to 70% by mol, still even more preferably from 30 to 60% by mol, and still even more preferably from 40 to 50% by mol, of a total amount of the carboxylic acid component and the alcohol component of all the polyesters in the resin binder.

The resin binder may contain other resins besides the polyester A and the polyester other than the polyester A within the range that would not impair the effects of the present invention. A total content of the polyester A and the polyester other than the polyester A is preferably 80% by weight or more, more preferably 90% by weight or more, even more preferably 95% by weight or more, still even more preferably substantially 100% by weight, and still even more preferably 100% by weight, of the resin binder, from the viewpoint of improving low-temperature fusing ability, heat-resistant storage property, high-temperature offset resistance, and durability of the toner. Other resin binders include vinyl resins, epoxy resins, polycarbonates, polyurethanes, and the like.

Here, in the present invention, the polyester may be a modified polyester to an extent that the properties thereof are not substantially impaired. The modified polyester refers to, for example, a polyester grafted or blocked with a phenol, a urethane, an epoxy or the like according to a method described in Japanese Patent Laid-Open No. Hei-11-133668, Hei-10-239903, Hei-8-20636, or the like.

<Releasing Agent>

The releasing agent used in the toner of the present invention contains an ester wax, from the viewpoint of improving low-temperature fusing ability and heat-resistant storage property of the toner.

The ester wax refers to a wax having an ester group, and the ester wax includes natural ester waxes and synthetic ester waxes. The ester wax is preferably a natural ester wax, from the viewpoint of improving heat-resistant storage property of the toner.

The natural ester wax includes carnauba wax, montan ester wax, rice wax, candelilla wax, and the like, any of which may be used in the toner of the present invention. In the present invention, the carnauba wax is preferred, from the viewpoint of improving low-temperature fusing ability and heat-resistant storage property of the toner.

The synthetic ester wax refers to an ester compound obtainable by reacting a carboxylic acid and an alcohol.

The carboxylic acid has the number of carbon atoms of preferably from 2 to 30, more preferably from 8 to 30, even more preferably from 12 to 30, still even more preferably from 12 to 24, still even more preferably from 14 to 24, and still even more preferably from 18 to 24, from the viewpoint of improving low-temperature fusing ability and heat-resistant storage property of the toner.

In addition, the carboxylic acid may be any of monocarboxylic, dicarboxylic, or tricarboxylic or higher polycarboxylic, and monocarboxylic acid is preferred, from the viewpoint of improving low-temperature fusing ability and heat-resistant storage property of the toner.

The carboxylic acid is preferably a fatty acid having a linear alkyl group or a linear alkenyl group, and the fatty acid having a linear alkyl group is more preferred, from the same viewpoint.

The fatty acid having a linear alkyl group includes, for example, caprylic acid, capric acid, lauric acid, myristic acid, palmitic acid, stearic acid, arachidic acid, behenic acid, lignoceric acid, cerotic acid, montanic acid, mellisic acid, and the like.

The alcohol may be any of monohydric, dihydric, or trihydric or higher polyhydric.

The monohydric alcohol has the number of carbon atoms of preferably from 2 to 30, more preferably from 8 to 30, even more preferably from 12 to 30, and even still more preferably from 12 to 24, from the viewpoint of improving low-temperature fusing ability and heat-resistant storage property of the toner. In addition, the monohydric alcohol having a linear alkyl group or alkenyl group is preferred, and the monohydric alcohol having a linear alkyl group is more preferred, from the same viewpoint.

The monohydric alcohol having a linear alkyl group or alkenyl group includes, for example, lauryl alcohol, myristyl alcohol, cetyl alcohol, stearyl alcohol, arachidyl alcohol, behenyl alcohol, tetracosanol, hexacosanol, octacosanol, triacontanol, and the like.

The dihydric alcohol has the number of carbon atoms of preferably from 2 to 18, and more preferably from 2 to 10, from the viewpoint of improving low-temperature fusing ability and heat-resistant storage property of the toner. In addition, the dihydric alcohol is preferably an $\alpha,\omega$-linear alkanediol, from the same viewpoint.

The dihydric alcohol includes, for example, ethylene glycol, propylene glycol, 1,3-propanediol, 1,4-butanediol, 1,5-pentanediol, 1,6-hexanediol, 1,10-decanediol, and the like.

The trihydric or higher polyhydric alcohol has the number of carbon atoms of preferably from 3 to 10, and more preferably from 3 to 5, from the viewpoint of improving low-temperature fusing ability and heat-resistant storage property of the toner. In addition, the valence number of the trihydric or higher polyhydric alcohol is preferably from 3 to 6, and more preferably from 3 to 4, from the same viewpoint.

The trihydric or higher polyhydric alcohol includes, for example, glycerol, trimethylolpropane, pentaerythritol, and the like, and pentaerythritol is preferred, from the viewpoint of improving low-temperature fusing ability and heat-resistant storage property of the toner.

The synthetic ester wax is preferably an ester formed between an aliphatic monohydric alcohol having 14 to 24 carbon atoms and a fatty acid having 14 to 24 carbon atoms, and an ester formed between pentaerythritol and a fatty acid having 14 to 24 carbon atoms, and more preferably an ester formed between an aliphatic monohydric alcohol having 18 to 24 carbon atoms and a fatty acid having 18 to 24 carbon atoms, and an ester formed between pentaerythritol and a fatty acid having 18 to 24 carbon atoms, from the viewpoint of improving low-temperature fusing ability and heat-resistant storage property of the toner.

The ester wax is preferably carnauba wax, montan wax, rice wax, an ester formed between an aliphatic monohydric alcohol having 14 to 24 carbon atoms and a fatty acid having 14 to 24 carbon atoms, and an ester formed between pentaerythritol and a fatty acid having 14 to 24 carbon atoms, more preferably carnauba wax, an ester formed between an aliphatic monohydric alcohol having 18 to 24 carbon atoms and a fatty acid having 18 to 24 carbon atoms, and an ester formed between pentaerythritol and a fatty acid having 18 to 24 carbon atoms, and even more preferably carnauba wax, from the viewpoint of improving low-temperature fusing ability and heat-resistant storage property of the toner.

The content of the ester wax is preferably 2 parts by weight or more, more preferably 3 parts by weight or more, even more preferably 4 parts by weight or more, and still even more preferably 5 parts by weight or more, based on 100 parts by weight of the resin binder, from the viewpoint of improving low-temperature fusing ability of the toner. The content of the ester wax is preferably 13 parts by weight or less, more preferably 11 parts by weight or less, even more preferably 9 parts by weight or less, and still even more preferably 7 parts by weight or less, based on 100 parts by weight of the resin binder, from the viewpoint of improving heat-resistant storage property of the toner. Taking these viewpoints together, the content of the ester wax in the toner is preferably from 2 to 13 parts by weight, more preferably from 3 to 11 parts by weight, even more preferably from 4 to 9 parts by weight, and still even more preferably from 5 to 7 parts by weight, based on 100 parts by weight of the resin binder.

The ester wax has a melting point of preferably from 60° to 100° C. more preferably from 70° to 90° C., and even more preferably from 75° to 85° C., from the viewpoint of improving low-temperature fusing ability and heat-resistant storage property of the toner.

<Hydrocarbon Wax>

It is preferable that the releasing agent further contains a hydrocarbon wax, from the viewpoint of improving high-temperature offset resistance of the toner.

The hydrocarbon wax includes hydrocarbon waxes such as low-molecular weight polypropylenes, low-molecular weight polyethylenes, low-molecular weight polypropylene-polyethylene copolymers, microcrystalline waxes, paraffin waxes, and Fischer Tropsch wax, and oxides thereof. Among them, the hydrocarbon wax is preferably a low-molecular weight polypropylene and a paraffin wax, from the viewpoint of improving high-temperature offset resistance of the toner. Further, the hydrocarbon wax is more preferably a paraffin wax, from the viewpoint of improving low-temperature fusing ability of the toner.

The content of the hydrocarbon wax is preferably from 0.5 to 6 parts by weight, more preferably from 1 to 5 parts by weight, and even more preferably from 2 to 4 parts by weight, based on 100 parts by weight of the resin binder, from the viewpoint of improving low-temperature fusing ability, heat-resistant storage property, and high-temperature offset resistance of the toner.

The hydrocarbon wax has a melting point of preferably from 60° to 140° C., more preferably from 65° to 120° C., and even more preferably from 70° to 90° C., from the viewpoint of improving low-temperature fusing ability, heat-resistant storage property, and high-temperature offset resistance of the toner.

A total amount of the ester wax and the hydrocarbon wax in the toner is preferably from 3 to 15 parts by weight, more preferably from 5 to 13 parts by weight, even more preferably from 6 to 11 parts by weight, and still even more preferably from 7 to 11 parts by weight, based on 100 parts by weight of the resin binder, from the viewpoint of improving low-temperature fusing ability, heat-resistant storage property, and high-temperature offset resistance of the toner.

<Ratio of Ester Wax/Hydrocarbon Wax>

The weight ratio of the ester wax to the hydrocarbon wax, i.e. ester wax/hydrocarbon wax, is preferably from 90/10 to 10/90, more preferably from 80/20 to 40/60, even more preferably from 70/30 to 45/55, and still even more preferably from 70/30 to 55/45, from the viewpoint of improving low-temperature fusing ability, heat-resistant storage property, and high-temperature offset resistance of the toner.

The difference in melting points between the ester wax and the hydrocarbon wax is preferably 60° C. or less, more preferably 40° C. or less, even more preferably 20° C. or less, and still even more preferably 10° C. or less, from the viewpoint of improving low-temperature fusing ability, heat-resistant storage property, and high-temperature offset resistance of the toner.

<Other Releasing Agents>

The toner of the present invention may properly contain a releasing agent other than the ester wax and the hydrocarbon wax to an extent that would not impair the effects of the present invention. The releasing agent other than the ester wax and the hydrocarbon wax includes natural oils such as silicone oils and jojoba oils.

The total content of the ester wax and the hydrocarbon wax is preferably 80% by weight or more, more preferably 90% by weight or more, even more preferably 95% by weight or more, still even more preferably substantially 100% by weight, and still even more preferably 100% by weight, of the releasing agent.

The toner of the present invention may contain a colorant, a charge control agent or the like, in addition to the resin binder and the releasing agent.

<Colorant>

In the present invention, as the colorant, all of the dyes, pigments and the like which are used as colorants for toners can be used, and carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, isoindoline, disazo yellow, or the like can be used. The toner of the present invention may be any of black toners and color toners. The content of the colorant in the toner is preferably from 1 to 20 parts by weight, more preferably from 2 to 10 parts by weight, and even more preferably from 3 to 8 parts by weight, based on 100 parts by weight of the resin binder, from the viewpoint of improving optical density and fusing ability of the toner.

<Charge Control Agent>

As the charge control agent, any of negatively chargeable charge control agents and positively chargeable charge control agents can also be used.

The negatively chargeable charge control agent includes metal-containing azo dyes, for example, "BONTRON S-28," commercially available from Orient Chemical Industries Co., Ltd.; "T-77," commercially available from Hodogaya Chemical Co., Ltd., "BONTRON S-34," c commercially available from Orient Chemical Industries Co., Ltd., "AIZEN SPILON BLACK TRH," commercially available from Hodogaya Chemical Co., Ltd., and the like; copper phthalocyanine dyes; metal complexes of alkyl derivatives of salicylic acid, for example, "BONTRON E-81," "BONTRON E-84," "BONTRON E-304," hereinabove commercially available from Orient Chemical Industries Co., Ltd., and the like; nitroimidazole derivatives; boron complexes of benzilic acid, for example, "LR-147," commercially available from Japan Carlit Co., Ltd.; nonmetallic charge control agents, for example, "BONTRON F-21," "BONTRON E-89," hereinabove commercially available from Orient Chemical Industries Co., Ltd., "T-8," commercially available from Hodogaya Chemical Co., Ltd., "FCA-2521NJ," "FCA-2508N," hereinabove commercially available from FUJIKURAKASEI CO., LTD., and the like.

The positively chargeable charge control agent includes Nigrosine dyes, for example, "BONTRON N-01," "BONTRON N-04," "BONTRON N-07," hereinabove commercially available from Orient Chemical Industries Co., Ltd., "CHUO CCA-3," commercially available from Chuo Synthetic Chemical Co., Ltd., and the like; triphenylmethane-based dyes containing a tertiary amine as a side chain; quaternary ammonium salt compounds, for example, "BONTRON P-51," commercially available from Orient Chemical Co., Ltd., "TP-415," commercially available from Hodogaya Chemical Co., Ltd., cetyltrimethylammonium bromide, "COPY CHARGE PX VP435," commercially available from Clariant, Ltd.; and the like.

The content of the charge control agent in the toner is preferably from 0.5 to 5 parts by weight, and more preferably from 1 to 3 parts by weight, based on 100 parts by weight of the resin binder, from the viewpoint of improving triboelectric stability of the toner.

<Other Components>

The toner of the present invention may further properly contain an additive such as a magnetic particulate, a fluidity improver, an electric conductivity modifier, an extender, a reinforcing filler such as a fibrous material, an antioxidant, or a cleanability improver.

<Method for Producing Toner>

The toner of the present invention may be a toner obtained by any of conventionally known methods such as a melt-kneading method, an emulsion aggregation method, and a polymerization method, and a pulverized toner produced by the melt-kneading method is preferred, from the viewpoint of improving productivity and releasing agent dispersibility. Therefore, the method for producing a toner of the present invention is preferably a method including the step of melt-kneading toner components including a resin binder and a releasing agent to provide a melt-kneaded product. Specifically, the toner can be produced by homogeneously mixing toner components such as a resin binder, a colorant, a charge control agent and a releasing agent with a mixer such as a Henschel mixer, thereafter melt-kneading the mixture, cooling, pulverizing, and classifying the product. On the other hand, a toner produced by the polymerization method or the emulsion aggregation method is preferred from the viewpoint of the production of toners having smaller particle sizes.

The melt-kneading of the toner components can be carried out with a known kneader, such as a closed kneader, a single-screw or twin-screw extruder, or an open-roller type kneader. From the viewpoint of being capable of efficiently highly dispersing the toner components such as a releasing agent, in the resin binder without repeats of kneading or without a dispersion aid, from the viewpoint of improving low-temperature fusing ability of the toner, and from the viewpoint of improving heat-resistant storage property of the toner, an open-roller type kneader provided with feeding ports and a discharging port for a kneaded product along the shaft direction of the roller is preferably used.

It is preferable that the toner components are previously homogeneously mixed with a Henschel mixer, a Super-Mixer or the like, and thereafter fed to an open-roller type kneader, and the toner components may be fed from one feeding port, or dividedly fed to the kneader from plural feeding ports. It is preferable that the toner components are fed to the kneader from one feeding port, from the viewpoint of easiness of operation and simplification of an apparatus.

The open-roller type kneader refers to a kneader of which kneading unit is an open type, not being tightly closed, and the kneading heat generated during the kneading can be easily dissipated. In addition, it is desired that the open-roller type kneader is a kneader provided with at least two rollers. The open-roller type kneader usable in the present invention is a kneader provided with two rollers having different peripheral speeds, in other words, two rollers of a high-rotation roller having a high peripheral speed and a low-rotation roller having a low peripheral speed. In the present invention, it is preferable that the high-rotation roller is a heat roller, and that the low-rotation roller is a cooling roller, from the viewpoint of improving dispersibility of the toner components such as a releasing agent, in the resin binder.

The temperature of the roller can be adjusted by, for example, a temperature of a heating medium passing through the inner portion of the roller, and each roller may be divided in two or more portions in the inner portion of the roller, each being passed through with heating media of different temperatures.

The temperature at the end part of the component-supplying side of the high-rotation roller is preferably from 100° to 160° C., and the temperature at the end part of the component-supplying side of the low-rotation roller is preferably from 30° to 100° C.

In the high-rotation roller, the difference between setting temperatures of the end part of the component-supplying side and the end part of the kneaded product-discharging side is preferably from 20° to 60° C., more preferably from 20° to 50° C., and even more preferably from 30° to 50° C., from the viewpoint of preventing detachment of the kneaded product from the roller. In the low-rotation roller, the difference between setting temperatures of the end part of the component-supplying side and the end part of the kneaded product-discharging side is preferably from 0° to 50° C., more preferably from 0° to 40° C., and even more preferably from 0° to 20° C., from the viewpoint of improving dispersibility of the toner components such as a releasing agent in the resin binder.

The peripheral speed of the high-rotation roller is preferably from 2 to 100 m/min, more preferably from 10 to 75 m/min, and even more preferably from 25 to 50 m/min. The peripheral speed of the low-rotation roller is preferably from 1 to 90 m/min, more preferably from 5 to 60 m/min, and even more preferably from 15 to 30 m/min. In addition, the ratio between the peripheral speeds of the two rollers, i.e., low-rotation roller/high-rotation roller, is preferably from 1/10 to 9/10, and more preferably from 3/10 to 8/10.

Structures, size, materials and the like of the roller are not particularly limited. Also, the surface of the roller may be any of smooth, wavy, rugged, or other surfaces. In order to increase kneading share, it is preferable that plural spiral ditches are engraved on the surface of each roller.

The pulverizing step may be carried out in divided multi-stages. For example, the melt-kneaded product may be roughly pulverized to a size of from 1 to 5 mm or so, and the roughly pulverized product may then be further finely pulverized to a desired particle size.

The pulverizer usable in the pulverizing step is not particularly limited. For example, the pulverizer preferably usable in the rough pulverization includes a hammer-mill, an atomizer, Rotoplex, and the like, and the pulverizer preferably usable in the fine pulverization includes an impact type jet mill, a fluidised bed opposed jet mill, a rotary mechanical mill, and the like. It is preferable to use a fluidised bed opposed jet mill, from the viewpoint of pulverization efficiency.

The classifier usable in the classifying step includes an air classifier, a rotor type classifier, a sieve classifier, and the like. The pulverized product which is insufficiently pulverized and removed during the classifying step may be subjected to the pulverizing step again.

<External Additive Treatment Step>

It is preferable that the method for producing a toner of the present invention further includes, subsequent to the pulverizing and classifying step, the step of mixing the toner particles obtained, in other words, toner matrix particles, with an external additive.

The external additive includes, for example, fine inorganic particles of silica, alumina, titania, zirconia, tin oxide, zinc oxide, and the like, and fine organic particles such as fine melamine resin particles and fine polytetrafluoroethylene resin particles. Among them, it is preferable to use silicas in combination, and it is even more preferable to use together a silica having an average particle size of less than 20 nm and a silica having an average particle size of 20 nm or more at a weight ratio of from 90/10 to 10/90.

In the mixing of the toner matrix particles with an external additive, a mixer having an agitating member such as rotary blades is preferably used, more preferably a high-speed mixer such as a Henschel mixer or Super Mixer, and even more preferably a Henschel mixer.

<Volume-Median Particle Size of Toner>

The toner has a volume-median particle size $D_{50}$ of preferably from 3 to 15 µm, more preferably from 4 to 12 µm, and even more preferably from 6 to 9 µm, from the viewpoint of improving the image quality of the toner. The term "volume-median particle size $D_{50}$" as used herein means a particle size of which cumulative volume frequency calculated on a volume percentage is 50% counted from the smaller particle sizes. Also, in a case where the toner is treated with an external additive, the volume-median particle size is regarded as a volume-median particle size of the toner matrix particles.

The toner of the present invention can be used as a toner directly for monocomponent development, or as a toner mixed with a carrier for two-component development, in an apparatus for forming fixed images of a monocomponent development or a two-component development.

Regarding the embodiments mentioned above, the present invention will further disclose the toner for electrostatic image development and the method for producing a toner for electrostatic image development as set forth below.

<1> A toner for electrostatic image development containing a resin binder and a releasing agent, wherein the resin binder contains a polyester A having a furan ring, and wherein the releasing agent contains an ester wax.

<2> The toner for electrostatic image development according to the above <1>, wherein the polyester A having a furan ring is a polyester obtained by polycondensing a carboxylic acid component and an alcohol component, using, as raw material monomers, at least the carboxylic acid component containing a carboxylic acid compound having a furan ring and/or the alcohol component containing an alcohol having a furan ring.

<3> The toner for electrostatic image development according to the above <1> or <2>, wherein the polyester A having a furan ring is an amorphous resin.

<4> The toner for electrostatic image development according to any one of the above <1> to <3>, wherein the furan ring has a structure represented by formula (Ia) or (Ib).

<5> The toner for electrostatic image development according to any one of the above <2> to <4>, wherein the carboxylic acid compound having a furan ring is preferably at least one member selected from the group consisting of furan dicarboxylic acid compounds, furan carboxylic acid compounds, and the hydroxyfuran carboxylic acid compounds, more preferably a furan dicarboxylic acid compound, and even more preferably furan-2,5-dicarboxylic acid.

<6> The toner for electrostatic image development according to any one of the above <2> to <5>, wherein the carboxylic acid compound having a furan ring is preferably a carboxylic acid compound having a furan ring represented by the formula (Ia), and more preferably a furan dicarboxylic acid compound.

<7> The toner for electrostatic image development according to any one of the above <2> to <6>, wherein the alcohol having a furan ring is preferably an alcohol having a furan ring represented by the formula (Ia), and more preferably a furan di-alcohol.

<8> The toner for electrostatic image development according to any one of the above <2> to <7>, wherein a total amount of the carboxylic acid compound having a furan ring and the alcohol having a furan ring is preferably from 10 to 100% by mol, more preferably from 20 to 90% by mol, even more preferably from 20 to 80% by mol, still even more preferably from 30 to 70% by mol, and still even more preferably from 40 to 50% by mol, of the total amount of the carboxylic acid component and the alcohol component of the polyester A.

<9> The toner for electrostatic image development according to any one of the above <2> to <8>, wherein the content of the carboxylic acid compound having a furan ring is preferably from 10 to 100% by mol, more preferably from 20 to 100% by mol, even more preferably from 30 to 100% by mol, still even more preferably from 60 to 100% by mol, still even more preferably from 90 to 100% by mol, still even more preferably substantially 100% by mol, and still even more preferably 100% by mol, of the carboxylic acid component of the polyester A.

<10> The toner for electrostatic image development according to any one of the above <5> to <9>, wherein the content of the furan dicarboxylic acid compound is preferably from 10 to 100% by mol, more preferably from 20 to 100% by mol, even more preferably from 30 to 100% by mol, still even more preferably from 60 to 100% by mol, still even more preferably from 90 to 100% by mol, still even more preferably substantially 100% by mol, and still even more preferably 100% by mol, of the carboxylic acid component of the polyester A.

<11> The toner for electrostatic image development according to any one of the above <1> to <10>, wherein the polyester A having a furan ring is an aliphatic diol, as the alcohol component other than the alcohol having a furan ring.

<12> The toner for electrostatic image development according to the above <11>, wherein the number of carbon atoms of the aliphatic diol is preferably from 2 to 10, more preferably from 3 to 8, and even more preferably from 3 to 4.

<13> The toner for electrostatic image development according to the above <11> or <12>, wherein the aliphatic diol is an aliphatic diol having a hydroxyl group bonded to a secondary carbon atom.

<14> The toner for electrostatic image development according to the above <13>, wherein the number of carbon atoms of the aliphatic diol having a hydroxyl group bonded to a secondary carbon atom is preferably from 3 to 8, more preferably from 3 to 6, and even more preferably from 3 to 4, and wherein the aliphatic diol is preferably 1,2-propanediol and/or 2,3-butanediol.

<15> The toner for electrostatic image development according to any one of the above <11> to <14>, wherein the content of the aliphatic diol is preferably from 20 to 100% by mol, more preferably from 50 to 100% by mol, even more preferably from 70 to 100% by mol, still even more preferably substantially 100% by mol, and still even more preferably 100% by mol, of the alcohol component other than the alcohol having a furan ring.

<16> The toner for electrostatic image development according to any one of the above <13> to <15>, wherein the content of the aliphatic diol having a hydroxyl group bonded to a secondary carbon atom is preferably from 20 to 100% by mol, more preferably from 50 to 100% by mol, even more preferably from 70 to 100% by mol, still even more preferably substantially 100% by mol, and still even more preferably 100% by mol, of the alcohol component other than the alcohol having a furan ring.

<17> The toner for electrostatic image development according to any one of the above <11> to <16>, wherein the content of the aliphatic diol is preferably from 20 to 100% by mol, more preferably from 50 to 100% by mol, even more preferably from 70 to 100% by mol, still even more preferably substantially 100% by mol, and still even more preferably 100% by mol, of the alcohol component.

<18> The toner for electrostatic image development according to any one of the above <13> to <17>, wherein the content of the aliphatic diol having a hydroxyl group bonded to a secondary carbon atom is preferably from 20 to 100% by mol, more preferably from 50 to 100% by mol, even more preferably from 70 to 100% by mol, still even more preferably substantially 100% by mol, and still even more preferably 100% by mol, of the alcohol component.

<19> The toner for electrostatic image development according to any one of the above <2> to <18>, wherein the alcohol component contains a trihydric or higher polyhydric alcohol, preferably at least one member selected from the group consisting of glycerol, pentaerythritol, and trimethylolpropane, and more preferably glycerol.

<20> The toner for electrostatic image development according to the above <19>, wherein the content of the trihydric or higher polyhydric alcohol is preferably from 1 to 35% by mol, more preferably from 10 to 30% by mol, and even more preferably from 20 to 25% by mol, of the alcohol component.

<21> The toner for electrostatic image development according to any one of the above <1> to <20>, wherein the polyester A has a glass transition temperature of preferably from 50° to 85° C., and more preferably from 60° to 75° C.

<22> The toner for electrostatic image development according to any one of the above <1> to <21>, wherein the resin binder contains a polyester H having a softening point of exceeding 125° and 160° C. or less, and a polyester L having a softening point of from 90° to 125° C., wherein a difference in softening points of the polyester H and the polyester L is 10° C. or more, and wherein at least one of the polyester H and the polyester L is the polyester A having a furan ring.

<23> The toner for electrostatic image development according to the above <22>, wherein a difference in softening points between the polyester H having a higher softening point and the polyester L having a lower softening point is more preferably from 20° to 60° C., and even more preferably from 30° to 50° C.

<24> The toner for electrostatic image development according to the above <22> or <23>, wherein the polyester H has a softening point of more preferably from 135° to 155° C.

<25> The toner for electrostatic image development according to any one of the above <22> to <24>, wherein the polyester L has a softening point of more preferably from 90° to 110° C.

<26> The toner for electrostatic image development according to any one of the above <22> to <25>, wherein a total content of the polyester H and the polyester L is preferably 80% by weight or more, more preferably 90% by weight or more, even more preferably 95% by weight or more, still even more preferably substantially 100% by weight, and still even more preferably 100% by weight, of the resin binder.

<27> The toner for electrostatic image development according to any one of the above <22> to <26>, wherein it is preferable that at least one of the polyester H and the polyester L is a polyester A, and it is more preferable that the polyester L and the polyester H are polyester A's.

<28> The toner for electrostatic image development according to any one of the above <1> to <27>, wherein the content of the polyester A having a furan ring is preferably 10% by weight or more, more preferably 30% by weight or more, even more preferably 50% by weight or more, still even more preferably 80% by weight or more, still even more preferably substantially 100% by weight, and still even more preferably 100% by weight, of the resin binder.

<29> The toner for electrostatic image development according to any one of the above <2> to <28>, wherein a total amount of the carboxylic acid compound having a furan ring and the alcohol having a furan ring is preferably 5% by mol or more, more preferably 15% by mol or more, even more preferably 20% by mol or more, still even more preferably 30% by mol or more, and still even more preferably 40% by mol or more, and preferably 80% by mol or less, more preferably 70% by mol or less, even more preferably 60% by mol or less, and still even more preferably 50% by mol or less, and preferably from 5 to 80% by mol, more preferably from 15 to 80% by mol, even more preferably from 20 to 70% by mol, still even more preferably from 30 to 60% by mol, and still even more preferably from 40 to 50% by mol, of a total amount of the carboxylic acid component and the alcohol component of all the polyesters in the resin binder.

<30> The toner for electrostatic image development according to any one of the above <1> to <29>, wherein a total content of the polyester A and the polyester other than the polyester A is preferably 80% by weight or more, more preferably 90% by weight or more, even more preferably 95% by weight or more, still even more preferably substantially 100% by weight, and still even more preferably 100% by weight, of the resin binder.

<31> The toner for electrostatic image development according to any one of the above <1> to <30>, wherein the ester wax is preferably a natural ester wax.

<32> The toner for electrostatic image development according to the above <31>, wherein the natural ester wax is a carnauba wax.

<33> The toner for electrostatic image development according to any one of the above <1> to <32>, wherein the ester wax is a synthetic ester wax obtainable by reacting a carboxylic acid and an alcohol.

<34> The toner for electrostatic image development according to the above <33>, wherein the synthetic ester wax is preferably an ester formed between an aliphatic monohydric alcohol having 14 to 24 carbon atoms and a fatty acid having 14 to 24 carbon atoms, and/or an ester formed between pentaerythritol and a fatty acid having 14 to 24 carbon atoms, and more preferably an ester formed between an aliphatic monohydric alcohol having 18 to 24 carbon atoms and a fatty acid having 18 to 24 carbon atoms, and/or an ester formed between pentaerythritol and a fatty acid having 18 to 24 carbon atoms.

<35> The toner for electrostatic image development according to any one of the above <1> to <34>, wherein the ester wax is preferably carnauba wax, montan wax, rice wax, an ester formed between an aliphatic monohydric alcohol having 14 to 24 carbon atoms and a fatty acid having 14 to 24 carbon atoms, and an ester formed between pentaerythritol and a fatty acid having 14 to 24 carbon atoms, more preferably carnauba wax, an ester formed between an aliphatic monohydric alcohol having 18 to 24 carbon atoms and a fatty acid having 18 to 24 carbon atoms, and an ester formed between pentaerythritol and a fatty acid having 18 to 24 carbon atoms, and even more preferably carnauba wax.

<36> The toner for electrostatic image development according to any one of the above <1> to <35>, wherein the content of the ester wax is preferably 2 parts by weight or more, more preferably 3 parts by weight or more, even more preferably 4 parts by weight or more, and still even more preferably 5 parts by weight or more, and preferably 13 parts by weight or less, more preferably 11 parts by weight or less, even more preferably 9 parts by weight or less, and still even more preferably 7 parts by weight or less, and preferably from 2 to 13 parts by weight, more preferably from 3 to 11 parts by weight, even more preferably from 4 to 9 parts by weight, and still even more preferably from 5 to 7 parts by weight, based on 100 parts by weight of the resin binder.

<37> The toner for electrostatic image development according to any one of the above <1> to <36>, wherein the ester wax has a melting point of preferably from 60° to 100° C., more preferably from 70° to 90° C., and even more preferably from 75° to 85° C.

<38> The toner for electrostatic image development according to any one of the above <1> to <37>, wherein the releasing agent further contains a hydrocarbon wax.

<39> The toner for electrostatic image development according to the above <38>, wherein the hydrocarbon wax is preferably a low-molecular weight polypropylene and/or a paraffin wax, and more preferably a paraffin wax.

<40> The toner for electrostatic image development according to the above <38> or <39>, wherein the content of the hydrocarbon wax is preferably from 0.5 to 6 parts by weight, more preferably from 1 to 5 parts by weight, and even more preferably from 2 to 4 parts by weight, based on 100 parts by weight of the resin binder.

<41> The toner for electrostatic image development according to any one of the above <38> to <40>, wherein the hydrocarbon wax has a melting point of preferably from 60° to 140° C., more preferably from 65° to 120° C., and even more preferably from 70° to 90° C.

<42> The toner for electrostatic image development according to any one of the above <38> to <41>, wherein a total amount of the ester wax and the hydrocarbon wax in the toner is preferably from 3 to 15 parts by weight, more preferably from 5 to 13 parts by weight, even more preferably from 6 to 11 parts by weight, and still even more preferably from 7 to 11 parts by weight, based on 100 parts by weight of the resin binder.

<43> The toner for electrostatic image development according to any one of the above <38> to <42>, wherein the weight ratio of the ester wax to the hydrocarbon wax, i.e. ester wax/hydrocarbon wax, is preferably from 90/10 to 10/90, more preferably from 80/20 to 40/60, even more preferably from 70/30 to 45/55, and still even more preferably from 70/30 to 55/45.

<44> The toner for electrostatic image development according to any one of the above <38> to <43>, wherein the difference in melting points between the ester wax and the hydrocarbon wax is preferably 60° C. or less, more preferably 40° C. or less, even more preferably 20° C. or less, and still even more preferably 10° C. or less.

<45> The toner for electrostatic image development according to any one of the above <1> to <44>, wherein the toner has a volume-median particle size $D_{50}$ of preferably from 3 to 15 μm, more preferably from 4 to 12 μm, and even more preferably from 6 to 9 μm.

<46> A method for producing a toner for electrostatic image development that contains at least a resin binder and a releasing agent, including melt-kneading components containing a resin binder and a releasing agent with an open-roller type kneader to give a melt-kneaded mixture, wherein the resin binder contains a polyester A having a furan ring, and wherein the releasing agent contains an ester wax.

EXAMPLES

The following examples further describe and demonstrate embodiments of the present invention. The examples are given solely for the purposes of illustration and are not to be construed as limitations of the present invention.

[Softening Point of Resin]

The softening point refers to a temperature at which half of the sample flows out, when plotting a downward movement of a plunger of a flow tester, commercially available from Shimadzu Corporation, CAPILLARY RHEOMETER "CFT-500D", against temperature, in which a 1 g sample is extruded through a nozzle having a die pore size of 1 mm and a length of 1 mm with applying a load of 1.96 MPa thereto with the plunger, while heating the sample so as to raise the temperature at a rate of 6° C./min.

[Highest Temperature of Endothermic Peak of Resin]

Measurements were taken using a differential scanning calorimeter "Q-100," commercially available from TA Instruments, Japan, by weighing out a 0.01 to 0.02 g sample in an aluminum pan, cooling the sample from room temperature to 0° C. at a cooling rate of 10° C./min, and cooling was stopped at that temperature for one minute. Thereafter, the temperature of the sample was raised at a rate of 10° C./min. Of the endothermic peaks observed, a temperature of the peak of the highest temperature side is defined as a highest temperature of endothermic peak.

[Glass Transition Temperature of Resin]

Measurements were taken using a differential scanning calorimeter "Q-100," commercially available from TA Instruments, Japan, by heating a 0.01 to 0.02 g sample weighed out in an aluminum pan to 200° C. and cooling the sample from that temperature to 0° C. at a cooling rate of 10° C./min. Next, the sample was measured while heating at a rate of 10° C./min. A temperature of an intersection of the extension of the baseline of equal to or lower than the highest temperature of endothermic peak and the tangential line showing the maximum inclination between the kick-off of the peak and the top of the peak in the above measurement is defined as a glass transition temperature.

[Acid Value of Resin]

The acid value is determined by a method according to JIS K0070 except that only the determination solvent is changed from a mixed solvent of ethanol and ether as defined in JIS K0070 to a mixed solvent of acetone and toluene in a volume ratio of acetone:toluene=1:1.

[Melting Point of Releasing Agent]

A highest temperature of endothermic peak observed from endothermic curve of the heat of fusion obtained by raising the temperature of a sample to 200° C. at a heating rate of 10° C./min, cooling the sample from this temperature to −10° C. at a cooling rate of 5° C./min, and thereafter raising the temperature of the sample to 180° C. at a heating rate of 10° C./min, using a differential scanning calorimeter "DSC Q-20," commercially available from TA Instruments, Japan, is referred to as a melting point.

[Average Particle Size of External Additive]

The average particle size of the primary particles of the external additive is obtained by the following formula:

Average Particle Size (nm)=6/($\rho$×Specific Surface Area (m$^2$/g))×1000 wherein $\rho$ is a specific gravity of a fine inorganic powder or an external additive, and in the case of silica, the specific gravity is 2.2; and a specific surface area is a BET specific surface area obtained by nitrogen adsorption method.

In the case of hydrophobically treated external additive, a specific surface area is a specific surface area of a raw powder before the hydrophobic treatment.

Incidentally, the above formula is obtained from:

Specific Surface Area=$S$×(1/m)

wherein m(Mass of Particles)=4/3×π×(R/2)$^3$×True Specific Gravity, and S (Surface Area)=4π(R/2)$^2$,
supposing that a sphere has a particle size R.

[Volume-Median Particle Size $D_{50}$ of Toner]

Measuring Apparatus Coulter Multisizer II commercially available from Beckman Coulter, Inc.

Aperture Diameter: 100 μm

Analyzing Software: Coulter Multisizer AccuComp Ver. 1.19 commercially available from Beckman Coulter, Inc.

Electrolytic solution: "Isotone II" commercially available from Beckman Coulter, Inc.

Dispersion: "EMULGEN 109P" commercially available from Kao Corporation, polyoxyethylene lauryl ether, HLB: 13.6 is dissolved in the above electrolytic solution so as to have a concentration of 5% by weight to provide a dispersion.

Dispersion Conditions: Ten milligrams of a measurement sample is added to 5 ml of the above dispersion, and the mixture is dispersed for 1 minute with an ultrasonic disperser, and 25 ml of the above electrolytic solution is added to the dispersion, and further dispersed with an ultrasonic disperser for 1 minute, to prepare a sample dispersion.

Measurement Conditions: The above sample dispersion is added to 100 ml of the above electrolytic solution to adjust to a concentration at which particle sizes of 30,000 particles can be measured in 20 seconds, and thereafter the 30,000 particles are measured, and a volume-median particle size $D_{50}$ is obtained from the particle size distribution.

[Production Examples of Resins]

A 5-liter four-necked flask equipped with a thermometer, a stainless steel stirring rod, a reflux condenser, and a nitrogen inlet tube was charged with raw material monomers and esterification catalyst and promoter, as listed in Table 1, and the contents were heated in a mantle heater to 180° C. in a nitrogen atmosphere, and thereafter heated to 210° C. over 5 hours. Thereafter, having confirmed that a reaction percentage at 210° C. reached 95% or higher, the reaction mixture was subjected to a reaction at 40 kPa until a softening point as listed in Table 1 was reached, to provide each of Resins L-1, L-2, H-1, and H-2). Here, the reaction percentage as used herein means a value defined by a value calculated by: [amount of generated water in reaction/theoretical amount of generated water]×100.

TABLE 1

| | | L-1 | L-2 | H-1 | H-2 |
|---|---|---|---|---|---|
| Raw Materials Monomers | 1,2-Propanediol | 1520 g (100) | 1140 g (100) | 486 g (45) | 730 g (45) |
| | 2,3-Butanediol | — | — | 432 g (33) | 648 g (33) |
| | Glycerol | — | — | 294 g (22) | 442 g (22) |
| | 2,5-Furan Dicarboxylic Acid | 2496 g (80) | — | 1997 g (89) | — |
| | Terephthalic Acid | — | 1994 g (80) | — | 3187 g (89) |
| Ratio of Raw Materials | Amount of Furan Dicarboxylic Acid in Total Amount of Monomers, % by mol | 44 | 0 | 47 | 0 |
| Esterification Catalyst (Promoter) | Tin(II) 2-Ethylhexanoate | 20.1 g | 12.3 g | 16.0 g | 25.0 g |
| | Gallic Acid | 0.8 g | — | — | — |
| Physical Properties of Resin | Softening Point, ° C. | 103.2 | 103.8 | 149.8 | 147.8 |
| | Highest Temperature of Endothermic Peak, ° C. | 68.4 | 60.0 | 80.4 | 76.2 |
| | Softening Point/Highest Temperature of Endothermic Peak | 1.51 | 1.73 | 1.86 | 1.94 |

TABLE 1-continued

|  | L-1 | L-2 | H-1 | H-2 |
|---|---|---|---|---|
| Glass Transition Temperature, °C. | 62.9 | 56.0 | 74.4 | 70.8 |
| Acid Value, mg KOH/g | 2.3 | 5.4 | 10.5 | 10.3 |

Note)
Numerical values inside parenthesis are expressed by molar ratio.

Production Example 1 of Releasing Agent

Production of W-2

A four-necked rounded bottom flask equipped with a stirrer, a thermocouple, and a nitrogen inlet tube was charged with 4 mol of behenic acid per mol of pentaerythritol, and the contents were heated to 130° C. for 5 hours in a nitrogen atmosphere to carry out an esterification reaction. A reaction product was purified with methyl ether to provide pentaerythritol behenate. Here, the acid value was 0.4 mgKOH/g, and the hydroxyl value was 1.6 mgKOH/g.

Production Example 2 of Releasing Agents

Production of W-3

A four-necked rounded bottom flask equipped with a stirrer, a thermocouple, and a nitrogen inlet tube was charged with 1 mol of behenic acid per mol of behenyl alcohol, and the contents were heated to 130° C. for 3 hours in a nitrogen atmosphere to carry out an esterification reaction. A reaction product was purified with methyl ether to provide behenyl behenate. Here, the acid value was 0.1 mgKOH/g, and the hydroxyl value was 1.2 mgKOH/g The releasing agents used in Examples and Comparative Examples are listed as follows.

W-1: carnauba wax, "Carnauba Wax C1," commercially available from S. Kato & CO.: melting point: 80° C.

W-2: pentaerythritol behenate: melting point: 80° C.

W-3: behenyl behenate: melting point: 75° C.

W-4: paraffin wax "HNP-9," commercially available from NIPPON SEIRO CO., LTD.: melting point: 75° C.

W-5: polypropylene wax "Mitsui Hi-Wax NP056," commercially available from MITSUI CHEMICALS, INC.: melting point: 120° C.

Production Example of Toners

Examples 1 to 19 and Comparative Examples 1 to 5

Given amounts of resin binders and a releasing agent or releasing agents as listed in Tables 2 and 3, 3.0 parts by weight of a positively chargeable charge control agent "BONTRON N-01," a nigrosine dye commercially available from Orient Chemical Industries Co., Ltd., and 4.0 parts by weight of a colorant, "Mogul-L," carbon black commercially available from Cabot Corporation were mixed with a Henschel mixer for one minute, and the mixture was melt-kneaded under the conditions given below.

A continuous twin open-roller type kneader "Kneadex" commercially available from MITSUI MINING COMPANY, LIMITED, having an outer diameter of roller of 14 cm and an effective length of roller of 80 cm, was used. The operating conditions of the continuous twin open-roller type kneader are a peripheral speed of a high-rotation roller, a front roller, of 32.4 m/min, a peripheral speed of a low-rotation roller, a back roller, of 21.7 m/min, and a gap between the rollers at the end part of the feeding ports of the kneaded product of 0.1 mm. The temperatures of the heating medium and the cooling medium inside the rollers are as follows. The high-rotation roller had a temperature at the raw material supplying side of 135° C., and a temperature at the kneaded product discharging side of 90° C., and the low-rotation roller has a temperature at the raw material supplying side of 35° C., and a temperature at the kneaded product discharging side of 35° C. In addition, the feeding rate of the raw material mixture was 4 kg/hour, and the average residence time was about 6 minutes.

The melt-kneaded product was cooled, and then roughly pulverized to an average size of 1 mm with Rotoplex, commercially available from TOA KIKAI SEISAKUSHO. Thereafter, the roughly pulverized product was pulverized with a fluidized bed opposed jet mill "AFG-200" commercially available from: HOSOKAWA ALPINE AG, the pulverized product was classified with a rotor-type classifier "TTSP-100" commercially available from HOSOKAWA ALPINE AG, to provide toner matrix particles having a volume-median particle size $D_{50}$ of 7.0 μm.

One hundred parts by weight of the toner matrix particles obtained were mixed with 1.0 part by weight of a hydrophobic silica "TG-820F" commercially available from Cabot Specialty Chemicals Inc, average particle size: 8 nm and 1.0 part by weight of a hydrophobic silica "NA50H" commercially available from Nippon Aerosil Co., Ltd., average particle size: 40 nm with a Henschel mixer commercially available from MITSUI MINING COMPANY, LIMITED at 2,100 r/min, i.e. a peripheral speed of 29 m/sec, for 3 minutes, to provide each of the toners.

Examples 20 and 21

Given amounts of resin binders and a releasing agent or releasing agents as listed in Table 4, 3.0 parts by weight of a positively chargeable charge control agent "BONTRON N-01," a nigrosine dye commercially available from Orient Chemical Industries Co., Ltd., and 4.0 parts by weight of a colorant "Mogul-L," carbon black commercially available from Cabot Corporation, were mixed with a Henschel mixer for one minute, and the mixture was melt-kneaded under the conditions given below.

Thereafter, the mixture was melt-kneaded using a co-rotating twin-screw extruder PCM-30 commercially available from IKEGAI Corporation at a barrel setting temperature of 100° C., and a rotational speed of the screw of 200 r/min, i.e. peripheral speed of the screw rotations: 0.30 m/sec, under conditions of a mixture supplying rate of 10 kg/hr, to provide a kneaded product.

The pulverization and the classification were carried out in the same manner as in Example 1, to provide toner matrix particles having a volume-median particle size $D_{50}$ of 7.0 μm.

One hundred parts by weight of the toner matrix particles obtained were mixed with 1.0 part by weight of a hydrophobic silica "TG-820F" commercially available from Cabot Specialty Chemicals Inc, average particle size: 8 nm and 1.0 part by weight of a hydrophobic silica "NA50H" commercially available from Nippon Aerosil Co., Ltd., average particle size: 40 nm with a Henschel mixer commercially available from MITSUI MINING COMPANY, LIMITED at 2,100 r/min, i.e. a peripheral speed of 29 m/sec, for 3 minutes, to provide each of the toners.

Test Example 1

Lowest Fusing Temperature

A toner was loaded to a printer "HL-2040" commercially available from Brother Industries Ltd., modified so as to obtain an unfixed image, and an unfixed image which was a solid image of a square having a side of 2 cm was printed. Thereafter, this unfixed image was subjected to a fusing treatment at each temperature with an external fusing device, an modified device of an oilless fusing system "DL-2300" commercially available from Konica Minolta Business Solutions Japan Co., Ltd., a device in which a fusing roller was set at a rotational speed of 265 mm/sec, and a fusing roller temperature in the fusing device was made variable, while raising the fusing roller temperatures from 100° to 230° C. in an increment of 5° C., to provide fixed images. A sand-rubber eraser to which a load of 500 g was applied was moved backward and forward five times over a fixed image obtained at each fusing temperature, and optical densities of the fixed image before and after rubbing were measured with an optical densitometer "GREGSPM50," commercially available from Gretag. The temperature of the fusing roller at which a ratio of optical densities before and after rubbing, i.e. optical densities after rubbing/before rubbing×100, initially exceeds 90% is defined as a lowest fusing temperature, which was used as an index for low-temperature fusing ability. The lower the lowest fusing temperature, the more excellent the low-temperature fusing ability. The results are shown in Tables 2, 3, and 4.

Test Example 2

High-Temperature Offset Resistance

A toner was loaded to a printer "HL-2040" commercially available from Brother Industries, modified so as to obtain an unfixed image, and an unfixed image which was a solid image of a square having a side of 2 cm was printed. Thereafter, this unfixed image was subjected to a fusing treatment at each temperature with an external fusing device, an modified device of an oilless fusing system "DL-2300" commercially available from Konica Minolta Business Solutions Japan Co., Ltd., a device in which a fusing roller was set at a rotational speed of 140 mm/sec, and a fusing roller temperature in the fusing device was made variable, while raising the fusing roller temperatures from the above-mentioned lowest fusing temperature to 230° C. in an increment of 5° C. A temperature at which staining of the fusing roller is generated, leading to the generation of stains on white paper portions of the printout is defined as a high-temperature offset generating temperature, which was used as an index for high-temperature offset resistance. The higher the high-temperature offset generating temperature, the more excellent the high-temperature offset resistance. The results are shown in Tables 2, 3, and 4.

Test Example 3

Heat-Resistant Storage Property

A 20-ml polypropylene bottle was charged with 4 g of a toner. The toner-containing polypropylene bottle was placed in a thermohygrostat kept at 55° C. and a relative humidity of 80%, and the toner was stored for 48 hours in an open state without placing a lid of the polypropylene bottle. The degree of aggregation of the toner after storage was measured, which was used as an index for heat-resistant storage property. The smaller this numerical value, the more excellent the heat-resistant storage property. The results are shown in Tables 2, 3, and 4.

Degree of Aggregation

The degree of aggregation is measured with a powder tester commercially available from Hosokawa Micron Corporation.

Sieves having opening of 150 μm, 75 μm, and 45 μm are stacked on top of each other, 4 g of a toner is placed on the uppermost sieve, and the sieves are vibrated at an oscillation width of 1 mm for 60 seconds. After the vibration, an amount of the toner remaining on the sieve is measured, and the degree of aggregation is calculated using the following sets of formulas:

Degree of Aggregation $= a + b + c$, wherein $$a = \frac{\text{Mass of Toner Remaining on Top Sieve}}{\text{Amount of Sample}} \times 100$$

$$b = \frac{\text{Mass of Toner Remaining on Middle Sieve}}{\text{Amount of Sample}} \times 100 \times \frac{3}{5}$$

$$c = \frac{\text{Mass of Toner Remaining on Lower Sieve}}{\text{Amount of Sample}} \times 100 \times \frac{1}{5}$$

TABLE 2

| | Resin Binders | | | Releasing Agent | | Lowest Fusing Temp., °C | High-Temp. Offset Resistance | Heat-Resistant Storage Property |
|---|---|---|---|---|---|---|---|---|
| | Resin L, parts by wt. | Resin H, parts by wt. | Amount of Monomer Having Furan Ring, % by mol[1] | Kind | Content, parts by wt.[2] | | | |
| Ex. 1 | L-1(20) | H-1(80) | 47 | W-1 | 6 | 130 | 180 | 3 |
| Ex. 2 | L-1(20) | H-1(80) | 47 | W-2 | 6 | 135 | 180 | 4 |
| Ex. 3 | L-1(20) | H-1(80) | 47 | W-3 | 6 | 130 | 180 | 5 |
| Ex. 4 | L-2(20) | H-1(80) | 37 | W-1 | 6 | 130 | 180 | 5 |
| Ex. 5 | L-1(50) | H-2(50) | 28 | W-1 | 6 | 135 | 175 | 8 |
| Ex. 6 | L-1(20) | H-2(80) | 9 | W-1 | 6 | 140 | 180 | 7 |
| Ex. 7 | L-1(20) | H-1(80) | 47 | W-1 | 12 | 120 | 180 | 11 |
| Ex. 8 | L-1(20) | H-1(80) | 47 | W-1 | 9 | 125 | 180 | 8 |
| Ex. 9 | L-1(20) | H-1(80) | 47 | W-1 | 3 | 140 | 180 | 3 |

TABLE 2-continued

| | Resin Binders | | Amount of Monomer Having Furan Ring, % by mol[1] | Releasing Agent | | Lowest Fusing Temp., °C | High- Temp. Offset Resistance | Heat- Resistant Storage Property |
|---|---|---|---|---|---|---|---|---|
| | Resin L, parts by wt. | Resin H, parts by wt. | | Kind | Content, parts by wt.[2] | | | |
| Comp. Ex. 1 | L-1(20) | H-1(80) | 47 | W-4 | 6 | 150 | 190 | 6 |
| Comp. Ex. 2 | L-1(20) | H-1(80) | 47 | W-5 | 6 | 165 | 195 | 5 |
| Comp. Ex. 3 | L-2(20) | H-2(80) | 0 | W-1 | 6 | 165 | 180 | 23 |

[1] A proportion of the carboxylic acid component and the alcohol component each having furan ring of a total amount of the carboxylic acid component and the alcohol component of all the polyesters
[2] Parts by weight based on 100 parts by weight of the resin binder

TABLE 3

| | Resin Binders | | Amount of Monomer Having Furan Ring, % by mol[1] | Releasing Agent | | Lowest Fusing Temp., °C | High- Temp. Offset Resistance Resin L, parts by wt. | Heat- Resistant Storage Property Resin H, parts by wt. |
|---|---|---|---|---|---|---|---|---|
| | Resin L, parts by wt. | Resin H, parts by wt. | | Kind | Content, parts by wt.[2] | | | |
| Ex. 1 | L-1(20) | H-1(80) | 47 | W-1 | 6 | 130 | 180 | 3 |
| Ex. 10 | L-1(20) | H-1(80) | 47 | W-1 W-4 | 6 3 | 130 | 200< | 5 |
| Ex. 11 | L-1(20) | H-1(80) | 47 | W-2 W-4 | 6 3 | 130 | 200< | 10 |
| Ex. 12 | L-1(20) | H-1(80) | 47 | W-3 W-4 | 6 3 | 130 | 200< | 10 |
| Ex. 13 | L-1(20) | H-1(80) | 47 | W-1 W-5 | 6 3 | 150 | 200< | 7 |
| Ex. 14 | L-1(50) | H-1(50) | 47 | W-1 W-4 | 6 3 | 130 | 190 | 8 |
| Ex. 15 | L-2(20) | H-1(80) | 37 | W-1 W-4 | 6 3 | 140 | 200< | 5 |
| Ex. 16 | L-1(50) | H-2(50) | 28 | W-1 W-4 | 6 3 | 140 | 190 | 10 |
| Ex. 17 | L-1(20) | H-2(80) | 9 | W-1 W-4 | 6 3 | 150 | 200< | 5 |
| Ex. 18 | L-1(20) | H-1(80) | 47 | W-1 W-4 | 9 3 | 130 | 200< | 10 |
| Ex. 19 | L-1(20) | H-1(80) | 47 | W-1 W-4 | 3 3 | 140 | 200< | 4 |
| Comp. Ex. 4 | L-1(20) | H-1(80) | 47 | W-4 W-5 | 6 3 | 160 | 200< | 9 |
| Comp. Ex. 5 | L-2(20) | H-2(80) | 0 | W-1 W-4 | 6 3 | 160 | 200< | 25 |

[1] A proportion of the carboxylic acid component and the alcohol component each having furan ring of a total amount of the carboxylic acid component and the alcohol component of all the polyesters
[2] Parts by weight based on 100 parts by weight of the resin binder As is clear from Tables 2 and 3, the toners of Examples 1 to 19 have excellent low-temperature fusing ability and heat-resistant storage property, as compared to the toners of Comparative Examples 1 to 5. Further, as is clear from Table 3, if a releasing agent contains a hydrocarbon wax, the toner has improved high-temperature offset resistance.

TABLE 4

| | Resin Binders | | Releasing Agent | | | Lowest Fusing Temp., °C | High- Temp. Offset Resistance | Heat- Resistant Storage Property |
|---|---|---|---|---|---|---|---|---|
| | Resin L, parts by wt. | Resin H, parts by wt. | Kind | Content, parts by wt.[) ] | Kneader | | | |
| Ex. 1 | L-1(20) | H-1(80) | W-1 | 6 | Open-Roller Kneader | 130 | 180 | 3 |
| Ex. 20 | L-1(20) | H-1(80) | W-1 | 6 | Twin-Screw Kneader | 145 | 190 | 13 |

TABLE 4-continued

| | Resin Binders | | Releasing Agent | | | Lowest Fusing Temp., ° C. | High-Temp. Offset Resistance | Heat-Resistant Storage Property |
|---|---|---|---|---|---|---|---|---|
| | Resin L, parts by wt. | Resin H, parts by wt. | Kind | Content, parts by wt.¹⁾ | Kneader | | | |
| Ex. 10 | L-1(20) | H-1(80) | W-1 | 6 | Open-Roller Kneader | 130 | 200< | 5 |
| | | | W-4 | 3 | | | | |
| Ex. 21 | L-1(20) | H-1(80) | W-1 | 6 | Twin-Screw Kneader | 140 | 200< | 18 |
| | | | W-4 | 3 | | | | |

1) Parts by weight based on 100 parts by weight of the resin binder

As is clear from Table 4, it can be seen that when the components are melt-kneaded with a continuous, open-roller kneader in the melt-kneading step, the resulting toner has excellent low-temperature fusing ability and heat-resistant storage property.

The toner for electrostatic image development of the present invention can be suitably used in, for example, the development or the like of latent image formed in electrophotography, an electrostatic recording method, an electrostatic printing method, or the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A toner for electrostatic image development comprising a resin binder and a releasing agent, wherein the resin binder comprises a polyester A having a furan ring, and wherein the releasing agent comprises an ester wax.

2. The toner for electrostatic image development according to claim 1, wherein the polyester A having a furan ring is a polyester obtained by polycondensing a carboxylic acid component and an alcohol component, using, as raw material monomers, at least the carboxylic acid component comprising a carboxylic acid compound having a furan ring and/or the alcohol component comprising an alcohol having a furan ring.

3. The toner for electrostatic image development according to claim 2, wherein a total amount of the carboxylic acid compound having a furan ring and the alcohol having a furan ring is from 5 to 80% by mol of a total amount of the carboxylic acid component and the alcohol component of all the polyesters in the resin binder.

4. The toner for electrostatic image development according to claim 2, wherein a total amount of the carboxylic acid compound having a furan ring and the alcohol having a furan ring is 5% by mol or more and 50% by mol or less of a total amount of the carboxylic acid component and the alcohol component of all the polyesters in the resin binder.

5. The toner for electrostatic image development according to claim 2, wherein the alcohol component comprises an aliphatic diol.

6. The toner for electrostatic image development according to claim 5, wherein the aliphatic diol is an aliphatic diol having a hydroxyl group bonded to a secondary carbon atom.

7. The toner for electrostatic image development according to claim 2, wherein the carboxylic acid compound having a furan ring is at least one member selected from the group consisting of furan dicarboxylic acid compounds, furan carboxylic acid compounds, and the hydroxyfuran carboxylic acid compounds.

8. The toner for electrostatic image development according to claim 1, wherein the resin binder comprises a polyester H having a softening point of exceeding 125° and 160° C. or less, and a polyester L having a softening point of from 90° to 125° C., wherein a difference in softening points of the polyester H and the polyester L is 10° C. or more, and wherein at least one of the polyester H and the polyester L is the polyester A having a furan ring.

9. The toner for electrostatic image development according to claim 1, wherein the content of the polyester A having a furan ring is 10% by weight or more of the resin binder.

10. The toner for electrostatic image development according to claim 1, wherein the ester wax has a melting point of from 60° to 100° C.

11. The toner for electrostatic image development according to claim 1, wherein the releasing agent further comprises a hydrocarbon wax.

12. The toner for electrostatic image development according to claim 11, wherein the weight ratio of the ester wax to the hydrocarbon wax, i.e. the ester wax/the hydrocarbon wax, is from 90/10 to 10/90.

13. The toner for electrostatic image development according to claim 11, wherein a difference in melting points between the ester wax and the hydrocarbon wax is 60° C. or less.

14. The toner for electrostatic image development according to claim 1, wherein the content of the polyester A having a furan ring is 50% by weight or more of the resin binder.

15. The toner for electrostatic image development according to claim 1, wherein the ester wax is at least one member selected from the group consisting of carnauba waxes, esters formed between a monohydric aliphatic alcohol having 18 to 24 carbon atoms and a fatty acid having 18 to 24 carbon atoms, and esters formed between pentaerythritol and a fatty acid having 18 to 24 carbon atoms.

16. The toner for electrostatic image development according to claim 1, wherein the content of the ester wax is 2 parts by weight or more and 13 parts by weight or less, based on 100 parts by weight of the resin binder.

17. The toner for electrostatic image development according to claim 1, wherein the polyester A having a furan ring is an amorphous resin.

18. The toner for electrostatic image development according to claim 1, wherein the polyester A having a furan ring has a glass transition temperature of from 50° to 85° C.

19. A method for producing a toner for electrostatic image development that comprises at least a resin binder and a releasing agent, comprising melt-kneading components comprising a resin binder and a releasing agent with an open-roller type kneader to give a melt-kneaded mixture, wherein the resin binder comprises a polyester A having a furan ring, and wherein the releasing agent comprises an ester wax.

20. A toner for electrostatic image development comprising a resin binder and a releasing agent, wherein the resin binder comprises a polyester H having a softening point of exceeding 125° and 160° C. or less, and a polyester L having a softening point of from 90° to 125° C., wherein a difference in softening points of the polyester H and the polyester L is 10° C. or more, and wherein at least one of the polyester H and the polyester L is a polyester obtained by polycondensing a carboxylic acid component and an alcohol component, using, as raw material monomers, at least the carboxylic acid component comprising a carboxylic acid compound having a furan ring and/or the alcohol component comprising an alcohol having a furan ring, wherein a total amount of the carboxylic acid compound having a furan ring and the alcohol having a furan ring is 20% by mol or more and 80% by mol or less of a total amount of the carboxylic acid component and the alcohol component of all the polyesters in the resin binder, and wherein the releasing agent comprises an ester wax.

* * * * *